Figures 1, 2:
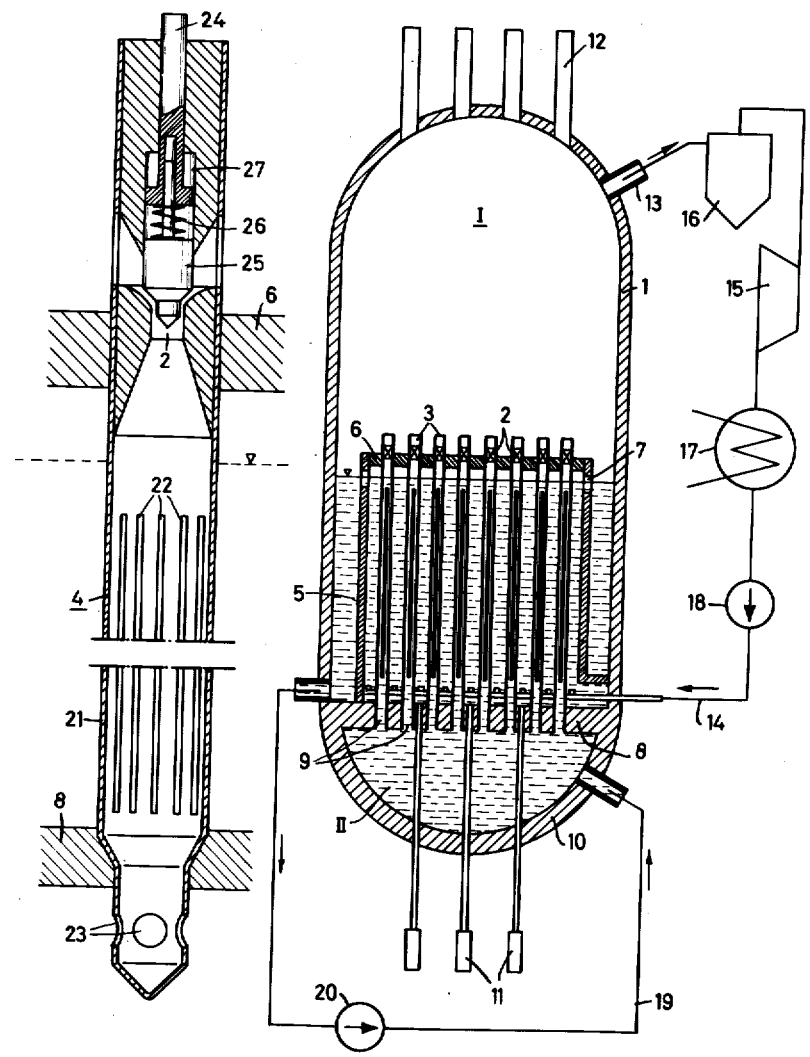

May 29, 1962 W. BRAUN 3,036,965
NUCLEAR REACTOR PLANT FOR POWER GENERATION
Filed Oct. 1, 1957

United States Patent Office 3,036,965
Patented May 29, 1962

3,036,965
NUCLEAR REACTOR PLANT FOR POWER GENERATION
Wolfgang Braün, Tennenlohe, Germany, assignor to Siemens-Schuckertwerke Aktiengesellschaft, Berlin-Siemensstadt, Germany, a corporation of Germany
Filed Oct. 1, 1957, Ser. No. 687,459
Claims priority, application Germany Oct. 6, 1956
10 Claims. (Cl. 204—193.2)

My invention relates to nuclear reactors for power generation which are moderated by light water or heavy water and in which the moderator serves as the coolant and as the working medium for power generation.

Relative to such power plants there are essentially two known methods of using the reactors for the generation of steam and hence for the operation of power machinery.

One of these methods is being used with boiling-water reactors and has the steam generation take place in the reactor pressure vessel itself, the power producing machinery, usually a turbine, being directly connected to the reactor vessel, i.e. into the primary circuit of a working medium flowing through the reactor. According to the other method, such steam generation in the reactor vessel itself is prevented by application of pressure, the thermal energy of the heated pressure water is used in a heat exchanger for vaporizing a second medium, and the steam generated of the second medium is applied to a turbine connected in the secondary circuit.

In comparison, each of these two types of reactors possess advantages as well as disadvantages. A disadvantage of the boiling-water reactor is the formation of vapor bubbles in the moderator fluid which greatly decreases its density so that the neutron energy loss is greatly increased. Although this is desirable for safety and reliability of the reactor operation because it prevents the reactor from inadvertently becoming supercritical, the excessive formation of bubbles, occurring particularly with load surges, causes reactivity variations of such magnitude that a regulation for constancy in steady-state operation is virtually infeasible.

These particular disadvantages do not obtain with the pressure-water reactor. However, extreme difficulties are encountered with the latter reactor due to the necessity for providing a thick-walled pressure vessel for the high operating pressure. The same difficulties apply to the heat exchanger and the other accessories of such a reactor plant.

It is an object of my invention to improve a boiling-water type reactor in a simple manner so that the reactor also possesses the advantages of the pressure-water reactor without incurring the disadvantages of both reactor types.

To this end, and in accordance with a feature of my invention, the reactor vessel is provided with two pressure zones of which one serves as the boiling or vaporization zone and is under the vapor pressure of the fluid working medium, whereas the other zone serves as the reaction zone and is kept under a higher pressure than the vaporization zone.

The foregoing object, as well as the advantages and features of my invention, these features being set forth with particularity in the claims annexed hereto, will be apparent from the following description in conjunction with the embodiment of a nuclear power reactor according to the invention shown by way of example on the drawing, in which:

FIG. 1 illustrates schematically a vertical sectional view of the reactor in conjunction with a schematic circuit diagram; and
FIG. 2 shows a vertical sectional view of one of the nuclear fuel elements of the same reactor.

As shown in FIG. 1, the cylindrical reactor vessel 1 is provided with two pressure zones I and II. Zone II is the reaction zone and zone I the vaporization zone. The two zones are in communication with each other through nozzles 2 which, in this embodiment, are mounted in the flow channels 3 that contain the nuclear fuel. The totality of the lattice arrangement of parallel flow channels, including the nuclear fuel elements contained therein, forms the active core in the lower portion of the reactor vessel. Suitable as nuclear fuel is natural uranium. However, the reactor is not limited to the use of natural uranium only, and other types of nuclear fuels may also be used.

In the preferred embodiment of the active core, the flow channels 3 consist individually of the exchangeable tubular jacket member 21 and its fuel element 4 shown in FIG. 2.

The fuel elements 4 are surrounded by a core tank 5 which contains the moderator liquid, preferably heavy water ($D_2O$). The tank also serves as a thermal shield. It is provided at its top with a lattice structure 6 whose perforations correspond to the diameter and arrangement of the fuel elements and which serves as a holder for these elements.

The walls of tank 5 have openings 7 at the level of the moderator liquid. The moderator liquid located within the tank 5 and serving for retardation of neutrons, communicates through holes 7 with the other portion of the moderator that forms a jacket around the tank 5 and serves as a reflector. The entire assembly so far described is located within the zone I kept under the evaporation pressure. The bottom of tank 5 is formed by a partitioning wall 8 of the reactor vessel 1 and is provided with openings 9 corresponding in number to the number of fuel elements. The fuel elements 4 are exchangeable and are inserted into respective holes 9 formed in the partition wall or bottom 8 so as to cooperate with the bottom 8 in separating the zone II of higher pressure from the zone I of lower pressure. The partitioning wall 8 and the vessel bottom 10 are thicker than the other vessel walls in accordance with the higher pressure in zone II.

For controlling and regulating the chain reaction, a number of control rods 11, containing neutron-absorbing material such as cadmium or boron, are displaceably inserted from below into the reactor vessel. Connected to the top of the reactor vessel 1 and properly pressure sealed are access pipes through which defective or depleted fuel elements can be eliminated and replaced.

The generated steam leaves the top portion of zone I through a steam outlet 13, and the circuit of the working medium extends from outlet 13 to an inlet 14 which passes through the reactor vessel 1 and the walls of tank 5 where it terminates in form of a ring-shaped outlet pipe near the bottom of the tank. Connected into the circuit of the working medium is a steam turbine 15, a water separator 16 being connected in series ahead of the turbine. A condenser 17 and a condensate-circulating pressure pump 18 are inserted into the condensate line 14.

For producing and maintaining the pressure difference between zones I and II, the bottom of zone I communicates with zone II through a pressure line 19 including a pressure pump 20. The pressure line 19 opens into the reflector space of zone II. In the illustrated embodiment the pressure pump 20 is called upon to produce a pressure of about 20 atmospheres (atm.) over the pressure in zone I; and the pressure in zone I, upon pressure reduction of the moderator by the nozzles 2, is approximately 25 to 26 atm.

In the embodiment of the fuel element shown in FIG. 2, the nozzles are located behind the fuel plates 22, seen in the flow direction, at about the height of the above-mentioned holder structure 6. The fuel plates 22 are inserted into the enclosing pressure jacket 21 of the fuel element. The conical bottom portion of jacket 21 is provided with inlet openings 23 for the working medium and is removably seated in one of the respective openings 9 of the partitioning wall 8.

The flow cross section of the moderator in the nozzle 2 is adjustable by means of a regulating device 24 in the top portion of the fuel element. The device 24 comprises a longitudinally displaceable member in which a valve piston 25 is slidable against the force of a spring 26. Since the neutron flow and thus the energy utilization in the reactor according to the invention have an approximately sinusoidal distribution over the cross section of the reactor vessel, the nozzles 2 of the respective fuel elements are adjusted in accordance with this neutron-flow distribution over the vessel cross section. That is, the flow cross sections in the respective nozzles are graduated so as to decrease in the radial direction away from the vessel axis. As a result, the temperature of the moderator evaporating out of the nozzles is substantially uniform over the entire vessel cross section. In the event the total flow through the reactor changes, the piston 25, under the effect of spring 26 and of a dampening chamber 27, takes care at each nozzle to maintain the above-mentioned fundamental differentiation between the respective nozzle cross sections in accordance with the neutron flow distribution.

By virtue of the above-described partitioning of the reactor vessel into two pressure zones, the following improved performance of the reactor is achieved.

The heat quantity generated in the active core by the chain reaction in critical operation heats the moderator entering into the fuel elements at a temperature of about 220° C. With a flow velocity of about 5 meters per second, the moderator reaches a temperature of about 250° at the nozzle exit of the fuel element. When emerging from the nozzle, the moderator reduces its pressure to the pressure of about 25 atm. under steam formation. The pressure reduction in the nozzles is accompanied by an intensive spraying or atomizing effect which results in a particularly large vaporization surface of the moderator.

By virtue of the described reactor design, the undesired formation of steam bubbles in the liquid moderator is prevented. This eliminates the density variations as well as the changes in moderator volume, which are the cause of the above-mentioned reactivity variations in steady-state operation.

The steam generated in zone I enters through the water separator 16 into the turbine 15 where it does work before it is precipitated in the condenser 17. The condensate pump 18 behind the condenser 17 increases the pressure of the moderator condensate, now cooled down to about 35° C., up to the steam pressure of zone I, that is to about 25 atm., and also delivers the moderator through the condensate line 14 into the space of the active core surrounded by the tank 5. Thus the active core is always supplied with cool condensate and, in all operating conditions, is surrounded by a moderator whose density remains substantially unchanged. This is tantamount to the fact that the critical volume of the reactor according to the invention is considerably smaller than that of a comparable boiling-water reactor.

The moderator, being gradually heated within the tank 5, passes through the openings 7 in the top portion of the tank and merges with the moderator quantity contained in the reflector space. From the reflector space, which is under the vapor pressure of zone I, the moderator, now heated to approximately 220° C., is withdrawn by action of the pressure pump 20 and is again brought up to the required higher pressure of zone II. In addition to the moderator entering through the openings 7, the reflector space also collects any portion of the moderator that, when spraying out of the nozzles, does not convert to the vapor phase and condenses at the vessel wall of the reactor.

The improvements afforded by the invention, compared with a pressure-water reactor, reside in the fact that the major portion of the reactor vessel need be dimensioned only for the relatively small vapor pressure of the moderator. Only the bottom of the reactor vessel and the partitioning wall 8 are to be given a larger wall thickness. For any given conditions, the pressure increase within the fuel elements is considerably lower in a reactor according to the invention as compared with the pressure in the pressure pipes of a pressure-water reactor.

Furthermore, the invention permits exchanging the fuel elements through the access tubes 12 in the same manner as known with boiling-water reactors. In contrast, a pressure-water reactor with a pressure header requires opening of the header vessel and loosening of the supply conduits to the fuel elements.

A further improvement of the reactor according to the invention, compared with both above-mentioned types of known reactors, is an increase in thermal efficiency. This is so because the adjustable nozzles readily permit maintaining a uniform nozzle exit temperature of the moderator over the entire cross section of the active core.

It will be apparent to those skilled in the art, upon study of this disclosure, that my invention permits of various modifications with respect to structural details and hence can be embodied in nuclear reactors and nuclear power plants other than the embodiment particularly illustrated and described herein, without departing from the essential features of my invention and within the scope of the claims annexed hereto.

I claim:

1. In a nuclear reactor plant for power generation including a reactor vessel having enclosed therein a reactor core assembly containing nuclear fuel, a moderator fluid in said vessel surrounding said fuel, and equipped with a system forming a power-generation circulatory path connected to said vessel when in operation wherein said fluid also acts as a power-generating medium; the improved construction wherein said reactor vessel is provided with partitioning means to subdivide it into two pressure zones having substantially different pressures during said operation, the lower pressure one of said zones defining a region for liquid phase of said fluid surrounding the core assembly and further defining a vapor region above the level of said liquid phase, means located below the liquid level of said one zone and forming an inlet from said power generation path for introducing said liquid phase into said one zone and means located in said vapor region and forming an outlet from said vapor region into said power generation path, pressure reducing nozzle means intermediate said two zones, said nozzle means having outlet openings located in said vapor region above said liquid level, means for adjusting said nozzle means during said operation to control the pressure in said one zone so that the fluid flashes into vapor at the point at which it leaves said nozzle means, the other of said two zones communicating with said fuel to form a nuclear reaction region, duct-forming means extending through said partitioning means and said nozzle means through which said two zones are in mutual communication, an external pressure line interconnecting said two zones and connected to said vessel at a location beneath said liquid level for carrying fluid from said one zone to said other zone, and means located in said external pressure line for attaining a substantial difference in pressure between said two zones during said operation.

2. A device according to claim 1, said duct-forming means comprising a multiplicity of flow conduits extending from said other zone into said one zone to above the liquid level of said fluid contained in said one zone, said pressure reducing nozzle means being located in said respective conduits behind said fuel relative to the flow direction of said fluid.

3. In a nuclear power reactor according to claim 2, said means for adjusting the nozzle means comprising means located in each of said conduits for varying the flow cross section of the nozzle means during operation of the reactor.

4. In a nuclear power reactor according to claim 3, said conduits and nozzle means being distributed over the active cross section of said core assembly, and said nozzle means having respectively different flow across sections graduated so as to decrease in radial direction away from the vessel axis, whereby the flow of said moderator fluid is graduated corresponding to the neutron distribution in said cross section of said core assembly.

5. In a nuclear reactor for power generation, a reactor vessel having a high-pressure bottom portion and a substantially lower pressure top portion and having a substantially horizontal perforate partitioning wall separating said two vessel portions, said vessel containing when in operation a moderator liquid filling said bottom portion and partly filling said top portion so as to define a liquid level and a vapor region thereabove in said top portion, a reactor-core assembly having tubular fuel-containing members extending from the perforations of said wall upward to said vapor region above said liquid level in said top portion, pressure-reduction nozzles having a tapered valve opening and a piston movable therein during operation of the reactor for controlling the flow of moderator through said opening to flash same into vapor at the point at which it leaves said nozzles, said nozzles being mounted on said respective fuel-containing members above said liquid level, said vessel being connected into a circulatory fluid path for power generation extending externally of said vessel from said vapor region of said top portion to below said liquid level of said top portion, and a second liquid circulation system extending from said bottom portion to a location below said liquid level of said top portion, said second system comprising a pressure pump for maintaining substantially different pressures in said respective two vessel portions.

6. A nuclear reactor according to claim 5, said top portion of said vessel being provided with a tank surrounding said fuel elements and forming an annular reflector interspace together with said vessel for containing said moderator liquid, said tank communicating with said interspace at a location remote from said partitioning wall but below said liquid level, and said power-generating circulatory path having a condensate-carrying portion in communication with the interior of said tank near the bottom of the latter.

7. In a nuclear reactor according to claim 5, said top portion of said vessel being provided with a tank surrounding said fuel elements and forming an annular reflector interspace together with said vessel for containing said moderator liquid, said tank communicating with said interspace at a location remote from said partitioning wall but below said liquid level, and said power-generating circulatory path having a condensate-carrying portion in communication with the interior of said tank near the bottom thereof, said reflector interspace being upwardly open toward said vapor region, and said second circulation system being in communication with said reflector space at the bottom thereof.

8. In a nuclear reactor according to claim 6, a holder structure mounted at the top of said tank and covering said tank, said structure having openings through which said fuel elements protrude upwardly.

9. In a nuclear reactor plant for power generation including a reactor vessel having enclosed therein a reactor core assembly containing nuclear fuel and a moderator fluid in said vessel surrounding said fuel, said vessel being connected when in operation with an exterior power-generating circulating system forming a circulatory path for said fluid whereby said fluid also acts as a power-generating medium; the improved construction wherein said reactor vessel is provided with partitioning means to subdivide it into two pressure zones having substantially different pressures during said operation, the lower pressure one of said zones defining a region for liquid phase of said fluid surrounding the core assembly and further defining a vapor region above the level of said liquid phase, the other zone of said vessel communicating with said fuel to form a nuclear reaction region, nozzle means having outlet openings located in said vapor region above the level of the moderator liquid in said one zone, duct-forming means comprising a multiplicity of flow conduits containing nuclear fuel and extending from said other zone of said vessel into said one zone to above the level of said liquid contained in said one zone so that said two zones communicate with each other through said conduits, said nozzle means being located in each of said respective conduits behind said fuel relative to the flow direction of said fluid, each of said nozzle means having a nozzle bore and a nozzle piston displaceable during operation of the reactor relative to said bore for varying the nozzle-flow cross section so that the moderator fluid flashes from liquid to vapor as it leaves the nozzle means, and spring means biasing said nozzle piston in the cross-section reducing direction, said power-generation path extending from said vapor region of siad low pressure zone to below the liquid level of said low pressure zone, an external pressure line interconnecting said two zones in series and connected to said vessel at a location beneath said liquid level for carrying fluid from said one zone to said other zone, and pressure producing means located in said external pressure line for maintaining the pressure of the fluid in said other zone substantially greater than that in said one zone.

10. In a nuclear reactor plant for power generation including a reactor vessel having enclosed therein a reactor core assembly containing nuclear fuel and a moderator fluid in said vessel surrounding said fuel, said vessel being connected when in operation with an exterior power-generating circulating system forming a circulatory path for said fluid whereby said fluid also acts as a power-generating medium; the improved construction wherein said reactor vessel is provided with partitioning means to subdivide it into two pressure zones having substantially different pressures during said operation, the lower pressure one of said zones defining a region for liquid moderator fluid surrounding the core assembly and forming a vapor region above the level of said liquid, the other zone of said vessel communicating with said fuel to form a nuclear reaction region, a multiplicity of flow conduits extending from the other zone of said vessel into said one zone to above the level of said fluid contained in said one zone, said two zones communicating with each other through said conduits, inlet means below said liquid level for introducing said fluid as a liquid from said power-generation circulating system into said one zone and outlet means connecting said vapor zone to said power-generation system, a pressure reducing nozzle located within each of said flow conduits above the liquid level of said moderator and adjustable during operation of the reactor to maintain the pressure in said other zone higher than in said one zone so that the coolant in liquid form is flashed to vapor as it leaves said nozzle, another fluid circulation system interconnecting said two zones and connected to said vessel at a location beneath said liquid level for carrying liquid moderator from the low pressure zone to the high pressure zone, and a pressure pump in said latter circulation system for maintaining said two zones of said vessel at substantially different pressures.

References Cited in the file of this patent

UNITED STATES PATENTS

| | | |
|---|---|---|
| 2,787,593 | Metcalf | Apr. 2, 1957 |
| 2,806,820 | Wigner | Sept. 17, 1957 |
| 2,823,179 | Snell et al. | Feb. 11, 1958 |
| 2,825,688 | Vernon | Mar. 4, 1958 |
| 2,837,477 | Fermi | June 3, 1958 |

FOREIGN PATENTS

| | | |
|---|---|---|
| 753,130 | Great Britain | July 18, 1956 |

OTHER REFERENCES

Harrer et al.: "International Conference on the Peaceful Uses of Atomic Energy," vol. 3, pp. 250–262 August 1955, U.N. publication, New York.